(12) United States Patent
Schwartz et al.

(10) Patent No.: US 6,947,410 B1
(45) Date of Patent: Sep. 20, 2005

(54) SYSTEM AND METHOD FOR COMMUNICATING DATA PACKETS USING A BACKPLANE SWITCH

(75) Inventors: David A. Schwartz, Palo Alto, CA (US); Sudhakar S. Valluru, Fremont, CA (US); Chun-Chin D. Wang, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/441,102

(22) Filed: Nov. 16, 1999

(51) Int. Cl.[7] .............................................. H04L 12/66
(52) U.S. Cl. ....................... 370/352; 370/401; 370/463
(58) Field of Search ................................. 370/214, 279, 370/327, 299, 300, 301, 302, 340, 352, 353, 370/360, 420, 432, 438, 354, 355, 356, 401, 370/419, 463

(56) References Cited

U.S. PATENT DOCUMENTS

| | | | |
|---|---|---|---|
| 4,665,514 A | 5/1987 | Ching et al. ................... | 370/60 |
| 4,771,425 A | 9/1988 | Baran et al. ................... | 370/85 |
| 4,819,228 A | 4/1989 | Baran et al. ................... | 370/85 |
| 4,903,261 A | 2/1990 | Baran et al. ................ | 370/84.2 |
| 5,524,110 A | 6/1996 | Danneels et al. .............. | 370/62 |
| 5,526,353 A | 6/1996 | Henley et al. .............. | 370/60.1 |
| 5,604,741 A | 2/1997 | Samuell et al. ............. | 307/402 |
| 6,157,649 A * | 12/2000 | Peirce | |
| 6,181,681 B1 * | 1/2001 | Hiscock | |
| 6,205,149 B1 * | 3/2001 | Lemaire | |
| 6,216,167 B1 * | 4/2001 | Momirov | |
| 6,275,499 B1 * | 8/2001 | Wynn | |
| 6,426,952 B1 * | 7/2002 | Francis | |
| 6,456,597 B1 * | 9/2002 | Bare | |
| 6,577,628 B1 * | 6/2003 | Hejza ......................... | 370/392 |
| 6,747,995 B1 * | 6/2004 | Brown et al. ................ | 370/493 |

OTHER PUBLICATIONS

Cisco Systems, "System Description for the Cisco Communications Network," Version 2.1, 3 pages, Jan. 1999.

* cited by examiner

Primary Examiner—Kwang Bin Yao
(74) Attorney, Agent, or Firm—Baker Botts L.L.P.

(57) ABSTRACT

A communications device includes a backplane, backplane cards, and a backplane switch. Each backplane card is coupled to the backplane and assigned an industry standard-based network address. The backplane switch, also coupled to the backplane, receives a first data packet with a first network address assigned to a backplane card and communicates the first data packet to the backplane card using the backplane.

53 Claims, 7 Drawing Sheets

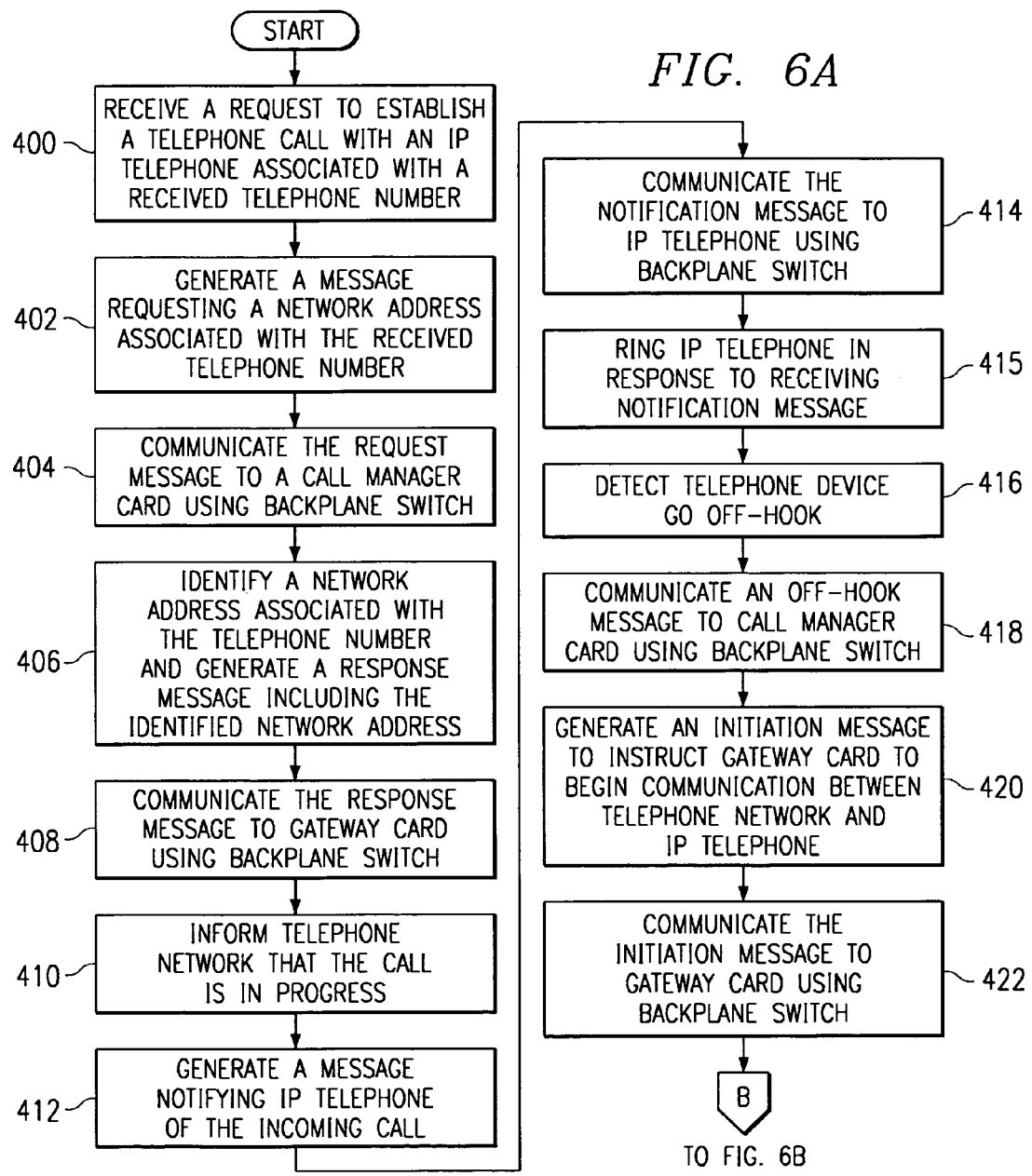

SYSTEM AND METHOD FOR COMMUNICATING DATA PACKETS USING A BACKPLANE SWITCH

TECHNICAL FIELD OF THE INVENTION

This invention relates to the field of data communications and, more particularly, to a system and method for communicating data packets using a backplane switch.

BACKGROUND OF THE INVENTION

Communications and processing devices typically include cards coupled to a backplane. To perform various operations, the cards communicate data to each other using backplane buses. Because only one card may communicate data over a backplane bus at a time, the devices rely on various protocols, such as Peripheral Component Interconnect (PCI) or VersaModule Eurocard (VME), to govern communication over the bus.

Unfortunately, existing bus protocols include several functional limitations that undermine their use in conjunction with many communications applications. For example, existing bus protocols either strictly limit the number of cards that can share a bus or necessitate complex and expensive solutions to scale to a higher number of cards. Similarly, to insert or remove cards without powering down the backplane, existing protocols require cards to carry an additional chipset. In addition, existing bus protocols generally lack a mechanism for providing selective treatment to a specific stream of information among several streams sharing the same backplane bus. Without a mechanism in communications devices for prioritizing the communication of real-time packets over other types of data packets, the performance of real-time applications using real-time data streams, such as voice or video data streams, degrades appreciably. Finally, because existing bus protocols are confined to communications over a backplane bus, a communications device must use an additional protocol to communicate with external devices. For these and other readily apparent reasons, existing bus protocols increasingly limit the functionality and diminish the performance of communications devices.

SUMMARY OF THE INVENTION

In accordance with the present invention, a system and method for communicating data packets using a backplane switch is provided that substantially eliminates or reduces disadvantages or problems associated with previously developed systems and methods.

In one embodiment, a communications device includes a backplane, backplane cards, and a backplane switch. Each backplane card is coupled to the backplane and assigned an industry standard-based network address. The backplane switch, also coupled to the backplane, receives a first data packet with a first network address assigned to a backplane card and communicates the first data packet to the backplane card using the backplane.

In another embodiment, a backplane card is assigned a first network address and coupled to a backplane within a communications device. The card includes an external port, an internal interface, and a communication module. The external port is coupled to an external network, and the internal interface coupled to a backplane bus. The communication module receives a first data packet from the backplane bus using the internal interface if the first data packet's destination address corresponds to the first network address. The communication module also communicates a second data packet to another backplane card by associating the second data packet with a second network address assigned to the other backplane card and communicating the second data packet to the backplane bus using the internal interface.

In another embodiment, a communications system includes network devices and a communications device. Each network device is assigned a network address. The communications device includes backplane cards and a backplane switch. The backplane cards are coupled to a backplane, and each backplane card is assigned a network address. The backplane switch is coupled to the backplane and the network devices. The backplane switch receives a first data packet with a first network address assigned to a network device and, in response, communicates the first data packet to the network device. The backplane switch also receives a second data packet with a second network address assigned to a backplane card and, in response, communicates the second data packet to the backplane card using the backplane. The network devices are external to the communications device.

In another embodiment, a backplane switch is coupled to a backplane of a communications device. The communications device has a plurality of backplane cards coupled to the backplane. The backplane switch includes internal ports, at least one external port, and a processing module. Each internal port is associated with a backplane card and communicates with the associated backplane card using the backplane. The external port is associated with a network device external to the communications device and communicates with the external network device. The processing module is coupled to the internal ports and the external port. The processing module receives a first data packet with a first network address assigned to the network device, identifies the external port associated with the network device, and communicates the first data packet to the external port for communication to the network device. The processing module also receives a second data packet with a second network address assigned to a backplane card, identifies an internal port associated with the backplane card, and communicates the second data packet to the identified internal port for communication to the backplane card.

The present invention provides a number of significant technical advantages. First, because the backplane cards communicate and receive data according to a network protocol, the communications device may use the same protocol to communicate data internally to the backplane cards and externally to network devices. This location transparency provides greater flexibility for deployment of backplane cards, network devices, and other communications components. In addition, the communications device may support any number of backplane cards without requiring fundamental hardware or software changes other than physical interfaces, such as sockets. By leveraging a network protocol that allows network devices to be hot plugged in and out of a local area network, backplane cards may be coupled to or de-coupled from the backplane while the device continues to operate. This hot swapability feature facilitates servicing and improves the availability of the communications device. The backplane cards and backplane switch may provide different classes of service for different types of data streams. By prioritizing the communication of real-time packets over other types of data packets, the communications device may service voice, fax, video, and other real-time data streams. Other features and advantages are readily apparent from the following description, figures, and claims.

BRIEF DESCRIPTION OF THE DRAWINGS

For a more complete understanding of the present invention, and further features and advantages, reference is now made to the following description, taken in conjunction with the accompanying drawings, in which:

FIGS. 6A and 6B are a flowchart demonstrating the operation of a communications application that uses a backplane switch to communicate data packets.

DETAILED DESCRIPTION OF THE DRAWINGS

Figure 1:
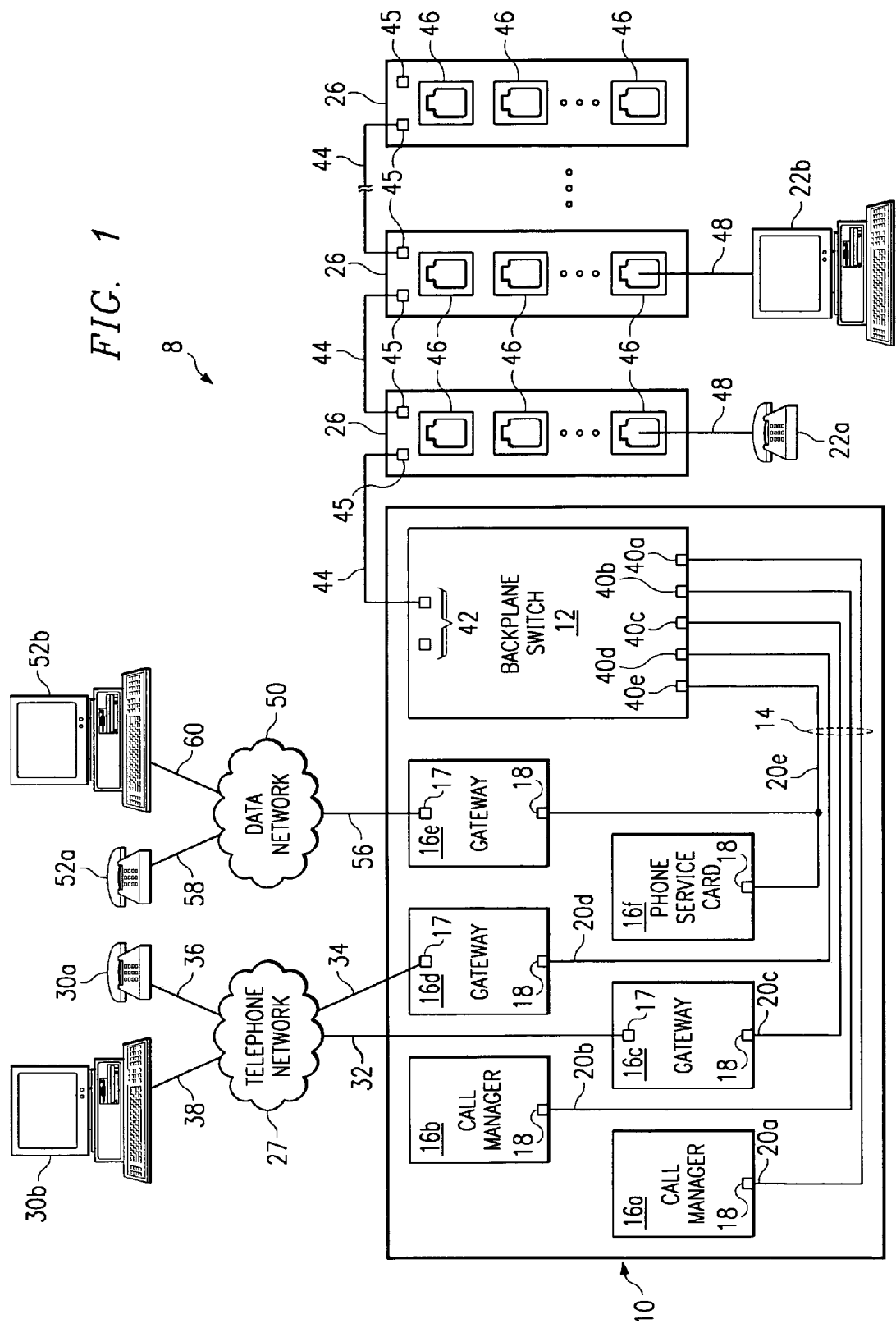
FIG. 1 illustrates a communication system including a communications device that communicates data packets using a backplane switch.

FIG. 1 illustrates a communication system 8 including a communications device 10 that communicates data packets using a backplane switch 12. Using backplane cards 16a, 16b, 16c, 16d, 16e, and 16f (collectively, backplane cards 16), communications device 10 may support telecommunications services, data communications services, or both. Backplane switch 12 communicates data packets to backplane cards 16 using a backplane 14. Backplane switch 12 also communicates data packets to external network devices 22a and 22b (collectively, network devices 22) using external network switches 26.

Backplane 14 communicates data packets between backplane switch 12 and backplane cards 16 using backplane buses 20a, 20b, 20c, 20d, and 20e (collectively, backplane buses 20). Backplane buses 20 electrically couple backplane switch 12 and backplane cards 16. In a particular embodiment, backplane buses 20 are electrical traces within one or more layers of backplane 14. Each backplane bus 20 may provide a dedicated bandwidth to one backplane card 16 or a shared bandwidth to two or more backplane cards 16. For example, in the illustrated embodiment, backplane buses 20a, 20b, 20c, and 20d provide a dedicated bandwidth to each backplane card 16a, 16b, 16c, and 16d, respectively, and backplane bus 20e provides a shared bandwidth to backplane cards 16e and 16f In a particular embodiment, where backplane bus 20 provides a dedicated bandwidth to backplane card 16, backplane bus 20 provides 100 megabits per second (Mbps) bandwidth between backplane switch 20 and backplane card 16 using 100BASE-T (often referred to as Fast Ethernet). The Institute of Electrical and Electronics Engineers (IEEE) define the 100 BASE-T standard in a specification commonly known as IEEE 802.3U. Backplane buses 20 may support serial, parallel, or any other suitable form of communication and may be associated with one or more intermediate components.

Backplane cards 16 perform various processing or communications operations associated with the functionality of communications device 10. As explained in further detail below, backplane cards 16 may include call manager cards 16a and 16b, gateway cards 16c, 16d and 16e, phone service cards (PSCs) 16f, or any other suitable backplane cards that perform processing or communications operations to provide voice, video, or other data services. Interfaces 18 electrically couple backplane cards 16 to backplane buses 20. In a particular embodiment, interfaces 18 are sockets, adapters, interconnects, or other suitable interfaces (generally referred to as interfaces 18) mounted to backplane 14, and backplane cards 16 plug or insert into the sockets.

Backplane cards 16 communicate data to backplane buses 20 and receive data from backplane buses 20 according to one or more network protocols. A network protocol is a set of rules that computers or other processing devices use to communicate over a local-area network (LAN), wide-area network (WAN), the Internet, or any other data network environment. Each backplane card 16 is assigned one or more network addresses according to one or more network protocols governing communication over backplane buses 20. For example, in a particular embodiment described in further detail below, each backplane card 16 is assigned a data link layer address associated with a data link layer protocol and a network layer address associated with a network layer protocol. The network addresses may be physical or virtual addresses from flat or hierarchical address spaces. In a particular embodiment, the network addresses are Internet Protocol (IP) addresses, Medium Access Control (MAC) addresses, or other industry standard-based network addresses. To communicate data to other backplane cards 16 or external network devices 22, each backplane card 16 encapsulates the data in one or more data packets, identifies a network address assigned to destination backplane card 16 or network device 22, specifies in a header or trailer of each data packet a destination address corresponding to the identified network address, and communicates the data packets to backplane bus 20. To receive data from other backplane cards 16 or external network devices 22, each backplane card 16 detects a data packet communicated over backplane bus 20, examines the destination address of the data packet, determines whether the destination address of the data packet corresponds to a network address assigned to backplane card 16, and receives the data packet if the destination address of the data packet corresponds to the assigned network address of backplane card 16. Backplane cards 16 may perform additional steps to communicate and receive data according to the specific network protocols employed by communications device 10.

In a particular embodiment, backplane cards 16 communicate and receive data according to an Ethernet protocol. In local area networks, network elements, such as computers, workstations, or other processing devices, use Ethernet to communicate data over a shared medium, such as a twisted wire or coaxial cable. Using Carrier Sense Multiple Access with Collision Detection (CSMA/CD) as defined in IEEE 802.3, the network elements contend for access to the shared medium, and if two or more elements simultaneously communicate data to the medium resulting in a collision, the elements wait a random amount of time before attempting to retransmit the data. Ethernet networks generally operate at a data rate of 10 million bits per second (Mbps) or 100 Mbps in the case of Fast Ethernet.

Using an Ethernet protocol, backplane cards 16 communicate and receive data packets called frames. Backplane cards 16 are assigned MAC addresses. MAC addresses are six bytes (or forty-eight bits) in length: the first three bytes are an Organizational Unique Identifier (OUI) assigned to a vendor by IEEE, and the last three bytes are an interface serial number administered by the specific vendor. Backplane cards 16 encapsulate data in a frame by adding a fourteen-byte header before the data and appending a four-byte Cyclic Redundancy Check (CRC) after the data. The header includes a six-byte destination MAC address, a six-byte source MAC address, and a two-byte type field. The destination MAC address specifies a single recipient (unicast mode), a group of recipients (multicast mode), or a set of all recipients (broadcast mode). The type field provides a Service Access Point (SAP) to identify the type of protocol, such as the IP protocol, being carried in the data payload. The CRC added at the end of the frame provides error detection in case a collision results in corruption of the frame. The entire frame is preceded by a small idle period and an eight-byte preamble.

As described above, to communicate data to other backplane cards 16 or external network devices 22, each backplane card 16 encapsulates the data in one or more frames, identifies a MAC address assigned to destination backplane card 16 or network device 22, specifies in a header of each frame a destination MAC address corresponding to the identified MAC address, and communicates the frames to backplane bus 20 according to an Ethernet protocol. To receive data from other backplane cards 16 or external network devices 22, each backplane card 16 detects a frame communicated over backplane bus 20, examines the destination MAC address of the frame, determines whether the destination MAC address of the frame corresponds to a MAC address assigned to backplane card 16, and receives the data packet if the destination MAC address corresponds to the assigned MAC address of backplane card 16.

Backplane switch 12 receives data packets with destination network addresses assigned to backplane cards 16 and network devices 22 and communicates the data packets to backplane cards 16 and network devices 22 using backplane 14. Backplane switch 12 includes internal ports 40*a*, 40*b*, 40*c*, 40*d*, and 40*e* (collectively, internal ports 40) electrically coupled to backplane buses 20*a*, 20*b*, 20*c*, 20*d*, and 20*e*, respectively, and external ports 42 electrically coupled to network switches 26. Backplane switch 12 may include one or more components either mounted directly to backplane 14 or installed on a circuit card that is plugged or inserted into a socket or other interface on backplane 14. When backplane switch 12 receives a data packet with a destination network address assigned to one of backplane cards 16, backplane switch 12 identifies internal port 40 associated with the destination network address and communicates the data packet to the identified internal port 40. Internal port 40 communicates the data packet to a corresponding backplane bus 20, and as described above, backplane card 16 coupled to backplane bus 20 receives the data packet according to the data packet's destination network address. When backplane switch 12 receives a data packet with a destination network address assigned to one of external network devices 22, backplane switch 12 identifies external port 42 associated with the destination network address and communicates the data packet to the identified external port 42. External port 42 then communicates the data packet to an external network device 22 assigned the destination network address.

In a particular embodiment, backplane switch 12 does not forward a data packet to internal ports 40 or external ports 42 if the data packet's destination address is associated with the port from which backplane switch 12 received the data packet. Internal ports 40 and external ports 42 couple backplane switch 12 to separate local area networks (LANs) and backplane switch 12 communicates data packets between the LANs based on the data packets' destination addresses. If a data packet's destination address is associated with the port from which backplane switch 12 received the data packet, then the data packet is communicated within a single LAN as opposed to between two different LANs. As a result, backplane switch 12 does not forward the data packet to internal ports 40 or external ports 42. For example, gateway card 16*e* may communicate a data packet with a destination address assigned to phone service card 16*f*. Because gateway card 16*e* and phone service card 16*f* are both coupled to backplane bus 20*e*, phone service card 16*f* may receive the data packet from backplane bus 20*e* without backplane switch 12 forwarding the data packet to internal ports 40 or external ports 42. When backplane switch 12 receives the data packet from internal port 40*e*, backplane switch 12 identifies internal port 40*e* as associated with the data packet's destination address and, as a result, does not forward the data packet to internal ports 40 or external ports 42.

External ports 42 may communicate data packets to a repeater, hub, extender, bridge, switch, router, or any other suitable intermediate network or communications device for further communication to external network devices 22. For example, in the illustrated embodiment, external port 42 communicates the data packets to network switches 26. Links 44 couple network switches 26 in series to external port 42 of backplane switch 12, and links 48 couple interfaces 46 of network switches 26 to external network devices 22. When each network switch 26 receives a data packet from link 44 using port 45, network switch 26 determines whether the data packet's destination address is associated with one of network devices 22 coupled to interfaces 46 and, if the destination address is associated with one of network devices 22, communicates the data packet to interface 46 coupled to network device 22. Interface 46 then communicates the data packet to external network device 22. Links 44 and 48 may include wireless, wireline, or any other suitable communication paths and may be associated with one or more intermediate components.

Backplane cards 16 may include gateway cards that communicate with telephones devices 30*a* and 30*b* (collectively, telephone devices 30) using a telephone network 27. In the illustrated embodiment, backplane cards 16*c* and 16*d* are gateway cards with external ports 17 coupled to telephone network 27. Telephone network 27 may include a public switched telephone network, a private switched telephone network, a wireless telephone network, or any other suitable telephone network environment. Telephone devices 30 may include a telephone 30*a*, a computer 30*b* with an analog or digital subscriber line (DSL) modem, a facsimile machine, or any other device that may communicate with gateway cards 16*c* and 16*d* using telephone network 27. Links 32 and 34 couple telephone network 27 to external ports 17 of gateway cards 16*c* and 16*d*, respectively, and links 36 and 38 couple telephone network 27 to telephone 30*a* and computer 30*b*, respectively. Links 32, 34, 36, and 38 may include any wireless, wireline, or other communication paths and may be associated with one or more intermediate components. In a particular embodiment, links 36 and 38 are twisted-pair telephone lines, and links 32 and 34 are T1 lines.

Gateway cards 16*c* and 16*d* process communications between network devices 22 and telephone devices 30. Gateway cards 16*c* and 16*d* may receive analog or digital data from telephone devices 30 using telephone network 27. If gateway cards 16*c* and 16*d* receive analog data from telephone network 27, then gateway cards 16*c* and 16*d* convert the analog data into digital data. Gateway cards 16c and 16d encapsulate the digital data into data packets with destination network addresses assigned to network device 22 and communicate the digital data packets to network devices 22 using backplane switch 12. Gateway cards 16c also receive digital data packets communicated from network devices 22 using backplane switch 12 and convert the data packets into analog or digital data for communication to telephone devices 30 using telephone network 27.

Backplane cards 16 may include gateway cards that are coupled to a data network 50 and communicate with external network devices 52a and 52b (collectively, network devices 52) using data network 50. In the illustrated embodiment, backplane card 16e is a gateway card with an external port 17 coupled to data network 50. Data network 50 may include a local-area network (LAN), a wide-area network (WAN), the Internet, or any other suitable data network environment. External network devices 52 coupled to data network 50 may include an IP telephone 52a, a computer 52b, a personal digital assistant (PDA), or any other communications or processing device that may communicate data packets with gateway card 16e using data network 50. Links 56, 58, and 60 couple data network 50 to gateway card 16e, IP telephony device 52a, and computer 52b, respectively. Links 56, 58, and 60 may include any wireless, wireline, or other communication paths and may be associated with one or more intermediate components. Gateway card 16e processes communications between external network devices 52 coupled to data network 50 and external network devices 22 coupled to backplane switch 12. Gateway card 16e receives data packets from network devices 52 using data network 50 and communicates the data packets to network devices 22 using backplane switch 12. Gateway card 16e also receives data packets from network devices 22 using backplane switch 12 and communicates the data packets to network devices 52 using data network 50.

In a particular embodiment, gateway card 16e receives, from data network 50, IP data packets with destination IP addresses assigned to network devices 22 and communicates the IP data packets to network devices 22 according to an Ethernet protocol. Gateway card 16e encapsulates each received IP data packet into one or more frames, identifies a MAC address associated with the destination IP address of the IP packet, specifies in a header of each frame a destination MAC address corresponding to the identified MAC address, and communicates the frames to backplane switch 12 using backplane bus 20e. Backplane switch 12 receives the MAC frames from internal port 40e and communicates the MAC frames to external port 42 according to the destination MAC address. Network switches 26 receive the MAC frames from external port 42, and one of network switches 26 communicates the MAC frames to external network device 22 assigned to the destination MAC address.

Similarly, in a particular embodiment, gateway card 16e receives, from network devices 22, IP data packets with destination IP addresses assigned to network devices 52 and communicates the IP data packets to network devices 52 using data network 50. Network devices 22 generate data packets with IP destination addresses associated with external network devices 52 coupled to data network 50. Network devices 22 encapsulate each IP data packet in one or more frames with a destination MAC address assigned to gateway card 16e. Network devices 22 then communicate the frames to backplane switch 12 using external switches 26. Backplane switch 12 receives the MAC frames using external port 42 and communicates the MAC frames to internal port 40e. Gateway card 16e receives the MAC frames from backplane bus 20e according to the destination MAC address of the frames. Gateway card 16e processes the MAC frames to generate one or more IP data packets with destination IP addresses assigned to network devices 52 and then communicates the IP data packets to network devices 52 using data network 50.

Backplane cards-16 may include call manager cards that manage telephony communications involving network devices 22. In the illustrated embodiment, backplane cards 16a and 16b are call manager cards. Call manager card 16a is in an active mode and manages telephony communications involving network devices 22, and call manager card 16b is in a stand-by mode and provides redundancy in case call manager card 16a fails. Call manager card 16a establishes, monitors, and terminates telephony communications among network devices 22, telephone devices 30, and network devices 52. Call manager card 16a may also support additional telephony functions, such as call processing, call routing, call holding, call transferring, caller identification, and device configuration. Using backplane switch 12, call manager card 16a communicates control information to and receives control information from gateway cards 16c, 16d, and 16e and network devices 22.

Backplane cards 16 may include phone service cards that support advanced features, such as telephone conferencing. In the illustrated embodiment, backplane card 16f is a phone service card. A telephone conference may include network devices 22, telephone devices 30, and network devices 52. Phone service card 16f receives three or more input data streams associated with the telephone conference and decodes the data streams into a linearized format for mixing. Phone service card 16f then mixes the linearized data streams to produce three or more output data streams that combine audio data in an appropriate manner for the conference participants. Phone service card 16f encodes the output data streams and communicates the encoded output data streams to network devices 22, telephone devices 30, or network devices 52.

Communications device 10 may provide selective treatment to particular data streams among several data streams sharing backplane buses 20. By prioritizing the communication of real-time data streams over other types of data streams, communications device 10 improves the performance of real-time applications using real-time data streams. Backplane cards 16 may assign a priority level to data packets by setting one or more priority bits in the data packets. In a particular embodiment, gateway cards 16c, 16d, and 16e receive data from telephone network 27 or data network 50, determine whether the data includes voice, video, or other real-time information, and, if the data includes voice, video, or other real-time information, assign a high priority level to the data packets encapsulating the data by setting one or more priority bits in the data packets. Like backplane cards 16, network devices 22 and 52 may also generate data packets and assign a priority level to the data packets by setting one or more priority bits. To provide two or more quality of service levels, backplane switch 12 and backplane cards 16 examine the priority bits in a received data packet, identify a quality of service level associated with the priority bits, and process the received data packet according to the identified quality of service level. In a particular embodiment, backplane cards 16 set one or more priority bits in Ethernet frames according to a standard defined in IEEE 802.1q, and backplane cards 16 and backplane switch 12 process the Ethernet frames according to the set priority bits.

The selective treatment of data streams may span more than one level of protocol. For example, gateway card 16e may receive from network device 52 an IP data packet with one or more priority bits indicating a quality of service level according to an IP protocol. Gateway card 16e examines the priority bits, identifies the quality of service level associated with the priority bits, and processes the data packet according to the identified quality of service level. When gateway card 16e encapsulates the received data packet into one or more frames for communication to backplane switch 12, gateway card 16e sets one or more priority bits in each frame to indicate a corresponding quality of service level according to an Ethernet protocol, such as IEEE 802.1q. As a result, when backplane switch 12 receives the frames, backplane switch 12 examines the priority bits in the frames, identifies the quality of service level associated with the priority bits, and processes the frames according to the identified quality of service level.

Because backplane cards 16 communicate and receive data packets according to a network protocol, communications device 10 provides a number of significant technical advantages. First, communications device 10 may use the same protocol to communicate data packets internally to backplane cards 16 and externally to network devices 22 and 52. This location transparency provides greater flexibility for deploying components in system 8. For example, backplane cards 16 could be housed internally within communications device 10 or externally without requiring complex communications software. In addition, the bus architecture of communications device 10 may support any number of backplane cards 16 without requiring fundamental hardware or software changes other than additional interfaces 18. By leveraging a network protocol that allows network devices 22 to be hot plugged in and out of a local area network, backplane cards 16 may be coupled to backplane 14 and de-coupled from backplane 14 while communications device 10 continues to operate. This hot swapability feature facilitates servicing and improves the availability of communications device 10. Also, as explained above, communications device 10 may support different quality of service levels for different types of data streams by setting or responding to one or more priority bits in communicated data packets.

Figure 2:
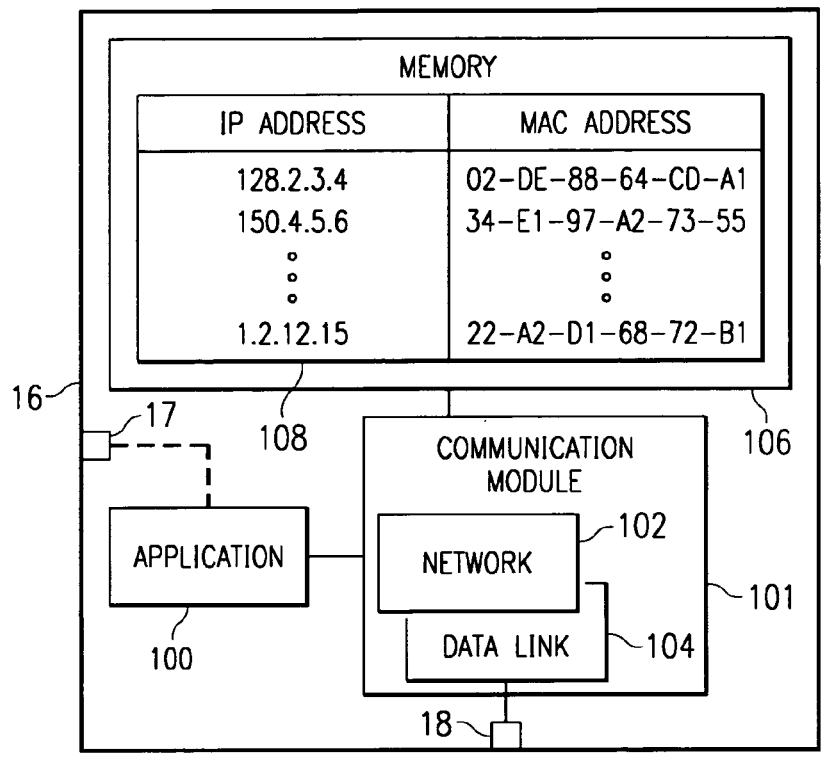
FIG. 2 illustrates a backplane card that communicates data packets to and receives data packets from a backplane bus according to an assigned network address.

FIG. 2 illustrates backplane card 16 that communicates and receives data packets according to an assigned network address. Backplane card 16 includes an application 100, a communication module 101, and a memory 106. Application 100 performs various processing or communications operations specific to the functionality of backplane card 16 and communicates with other backplane cards 16 and external network devices 22 using communication module 101. For example, in gateway cards 16c, 16d, and 16e, application 100 receives data from telephone network 27 or data network 50 using external port 17, processes the received data, and communicates the processed data to network devices 22 using communication module 101. In call manager cards 16a and 16b, application 100 establishes, monitors, and terminates telephony communications involving network devices 22 by communicating control information to gateway cards 16c, 16d, and 16e and network devices 22 using communication module 101. In phone service card 16f, application 100 receives input data streams from network devices 22, telephone devices 30, and network devices 52 using communication module 101, processes the input data streams to produce output data streams, and communicates the output data streams to network devices 22, telephone devices 30, and network devices 52 using communication module 101. Whatever the specific processing or communications operations performed by application 100, application 100 communicates with other components of system 8 using communication module 101.

Communication module 101 communicates data packets to and receives data packets from backplane bus 20 according to a network protocol. In the illustrated embodiment, communication module 101 includes a network layer 102 and a data link layer 104. Network layer 102 and data link layer 104 represent separate layers of protocol that are reasonably self-contained so that the tasks assigned to each layer may be designed, constructed, and updated substantially independent of the specific implementation of the other. Although a particular embodiment is described in detail, the present invention contemplates any combination of one or more layers of hardware, software, or hardware and software that communicates data packets to and receives data packets from backplane bus 20 according to one or more network protocols.

Network layer 102 and data link layer 104 communicate data from application 100 to other backplane cards 16 or network devices 22. Network layer 102 receives digital data from application 100 and encapsulates the application data in one or more network layer data packets. Network layer 102 identifies a network layer address assigned to destination backplane card 16 or network device 22 and specifies in a header or trailer of each data packet a destination address corresponding to the identified network layer address. Network layer 102 communicates the network layer packets to data link layer 104. Data link layer 104 receives and encapsulates the network layer packets in one or more data link layer packets. Using either an address lookup table 108 stored in memory 106 or an address resolution protocol, data link layer 104 identifies a data link layer address associated with the destination network layer address of the network layer data packets. Data link layer 104 specifies in a header or trailer of each data link layer packet a destination address corresponding to the identified data link layer address. Data link layer 104 then communicates the data link layer packets to backplane bus 20 using interface 18. In a particular embodiment, the network layer addresses are IP addresses, and the data link layer addresses are MAC addresses.

In a particular embodiment, data link layer 104 uses Address Resolution Protocol (ARP), a TCP/IP protocol, to convert an IP address into a MAC address. Data link layer 104 broadcasts an ARP request to backplane bus 20. All backplane cards 16 and network devices 22 receive and process the ARP request. Backplane card 16 or network device 22 assigned the IP address in the ARP request communicates an ARP reply with its assigned MAC address. Data link layer 104 receives the reply and saves the MAC address in address look-up table 108 (which, in this particular embodiment, is commonly called an ARP cache). Next time data link layer 104 must communicate with backplane card 16 or network device 22 associated with the IP address, data link layer 104 first checks look-up table 108 and, if it finds the associated MAC address, communicates a frame using the stored MAC address without making an ARP request. Look-up table 108 enables data link layer 104 to communicate data packets to a destination without creating ARP traffic because the MAC address of the destination is already known. For purposes of illustration in FIG. 2, address lookup table 108 includes IP addresses in dotted decimal notation and corresponding MAC addresses in hexadecimal form.

Network layer 102 and data link layer 104 also communicate data from backplane bus 20 to application 100. Data link layer 104 detects one or more data link layer data packets communicated over backplane bus 20. Data link layer 104 determines whether the destination address of each packet corresponds to the data link layer address assigned to backplane card 16 and receives the packets with corresponding destination addresses. Data link layer 104 processes the received packets to generate one or more network layer packets and communicates the network layer packets to network layer 102. Network layer 102 processes the network layer packets to generate application data and communicates the application data to application 100.

Figure 3:
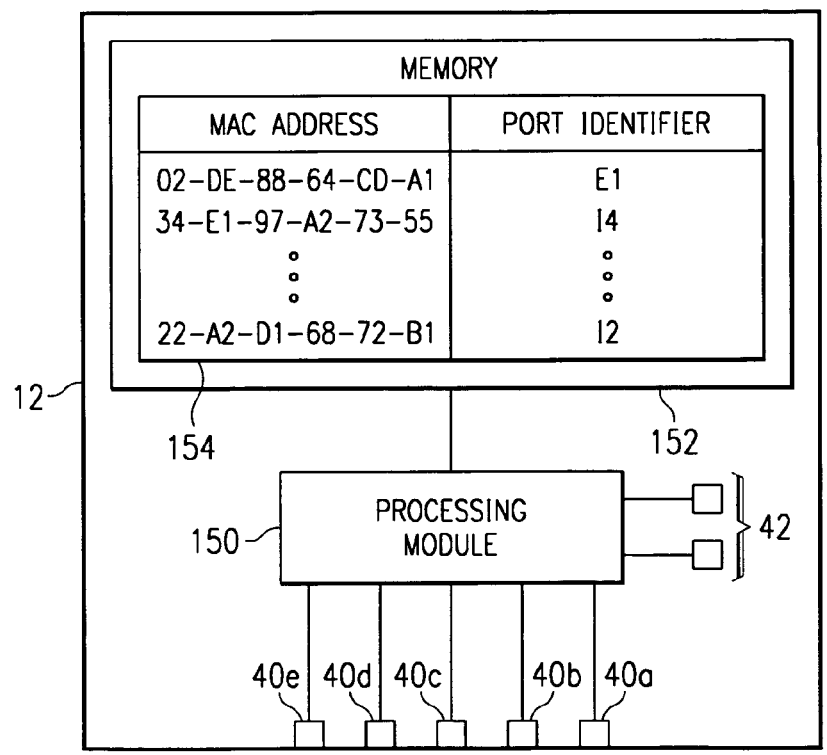
FIG. 3 illustrates a backplane switch with internal ports that communicate with backplane cards and external ports that communicate with external network devices.

FIG. 3 illustrates backplane switch 12 with internal ports 40 that communicate with backplane cards 16 and external ports 42 that communicate with external network devices 22. Backplane switch 12 includes processing module 150 and memory 152.

Processing module 150 receives data packets with destination network addresses and communicates the data packets to internal ports 40 and external ports 42 according to their destination network addresses. Internal ports 40 receive data packets from backplane cards 16 using backplane buses 20 and communicate the data packets to processing module 150 using links 156. External ports 42 receive data packets from external network devices 22 and communicate the data packets to processing module 150 using links 158. Processing module 150 receives a data packet from either internal ports 40 or external ports 42 and identifies internal port 40 or external port 42 as the source port from which it received the data packet. Using memory 152, processing module 150 identifies a destination port associated with the destination network address of the data pocket. In a particular embodiment, the destination network address is a MAC address, and as in the illustrated embodiment, memory 152 stores a look-up table 154 associating MAC addresses with port identifiers. For purposes of illustration, the MAC addresses in FIG. 3 appear in hexadecimal format, and the port identifiers E1, 14, and 12 correspond to first external port 42, fourth internal port 40d, and second internal port 40b, respectively.

If the destination port is different from the source port, processing module 150 communicates the data packet to the destination port. If the destination port is one of internal ports 40, internal port 40 communicates the data packet to one of backplane cards 16 using backplane bus 20. If the destination port is one of external ports 42, external port 42 communicates the data packet to one of external network devices 22 using network switches 26. As described above, if a data packet's destination address is associated with the port from which backplane switch 12 received the data packet, then the data packet is communicated within a single LAN as opposed to between two different LANs, and as a result, backplane switch 12 does not forward the data packet to another LAN by communicating the data packet to one of internal ports 40 or external ports 42. Although the operation of backplane switch 12 is described with reference to MAC addresses, backplane switch 12 may operate in a similar manner with any suitable network addressing scheme that may be used to communicate data among network devices 22 and backplane cards 16.

Figure 4:
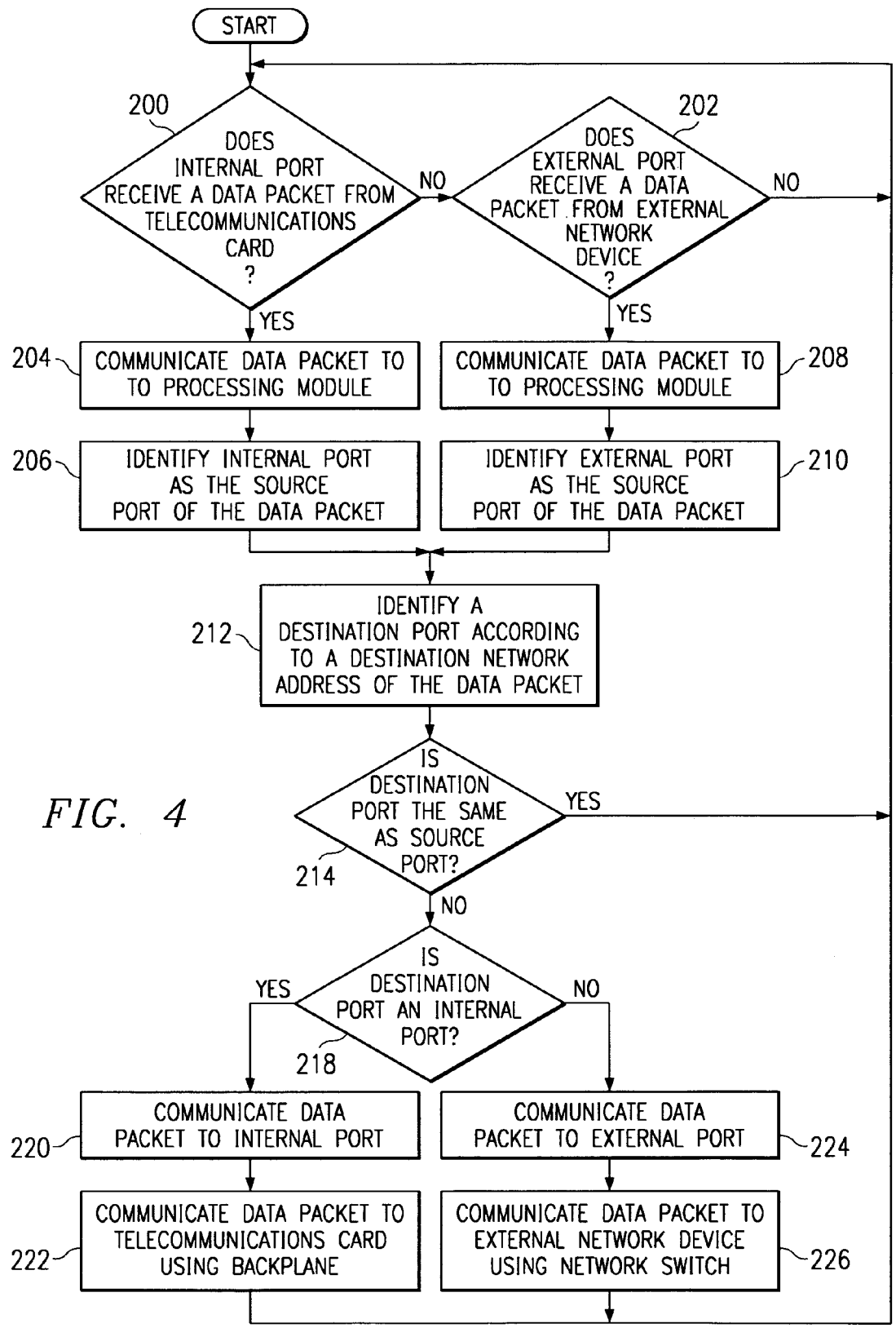
FIG. 4 is a flowchart demonstrating the operation of a backplane switch.

FIG. 4 is a flowchart demonstrating the operation of backplane switch 12. Internal port 40 may receive a data packet from backplane card 16 at step 200, or external port 42 may receive a data packet from external network device 22 at step 202. If internal port 40 receives a data packet from backplane card 16 at step 200, internal port 40 communicates the received data packet to processing module 150 at step 204, and processing module 150 identifies internal port 40 as the source port of the data packet at step 206. If external port 42 receives a data packet from external network device 22 at step 202, external port 42 communicates the received data packet to processing module 150 at step 208, and processing module 150 identifies external port 42 as the source port of the data packet at step 210.

At step 212, processing module 150 identifies a destination port according to a destination network address of the data packet. In a particular embodiment, processing module 150 retrieves from look-up table 154 an entry associated with the data packet's destination network address and examines the entry to identify a destination port. Processing module 150 determines whether the destination port is the same as the source port at step 214. If the destination port is the same as the source port, the method returns to steps 200 and 202 to receive another data packet. As described above, if a data packet's destination address is associated with the port from which backplane switch 12 received the data packet, then the data packet is communicated within a single LAN as opposed to between two different LANs, and as a result, backplane switch 12 does not forward the data packet to another LAN by communicating the data packet to one of internal ports 40 or external ports 42. If the destination port is not the same as the source port, processing module 150 determines whether the destination port is one of internal ports 40 at step 218. If the destination port is one of internal ports 40, then processing module 150 communicates the data packet to internal port 40 at step 220, and internal port 40 communicates the data packet to one of backplane cards 16 using backplane 14 at step 222. If the destination port is not one of internal ports 40, processing module 150 communicates the data packet to external port 42 at step 224, and external port 42 communicates the data packet to external network device 22 using network switch 26 at step 226. The method returns to steps 200 and 202 to receive another data packet.

Figure 5A:
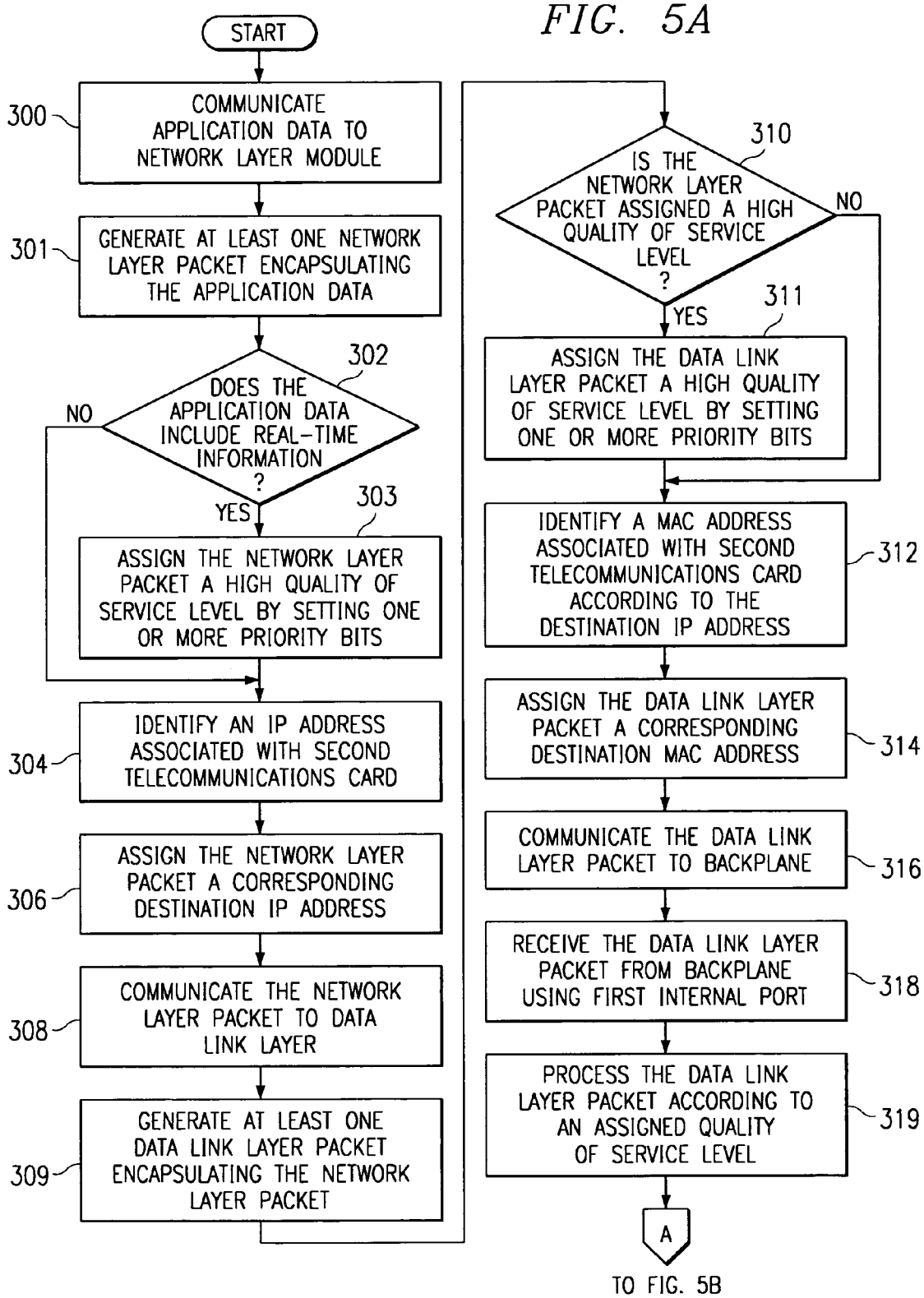
FIGS. 5A and 5B are a flowchart demonstrating a method of communicating data from a first backplane card to a second backplane card using a backplane switch.
Figure 5B:
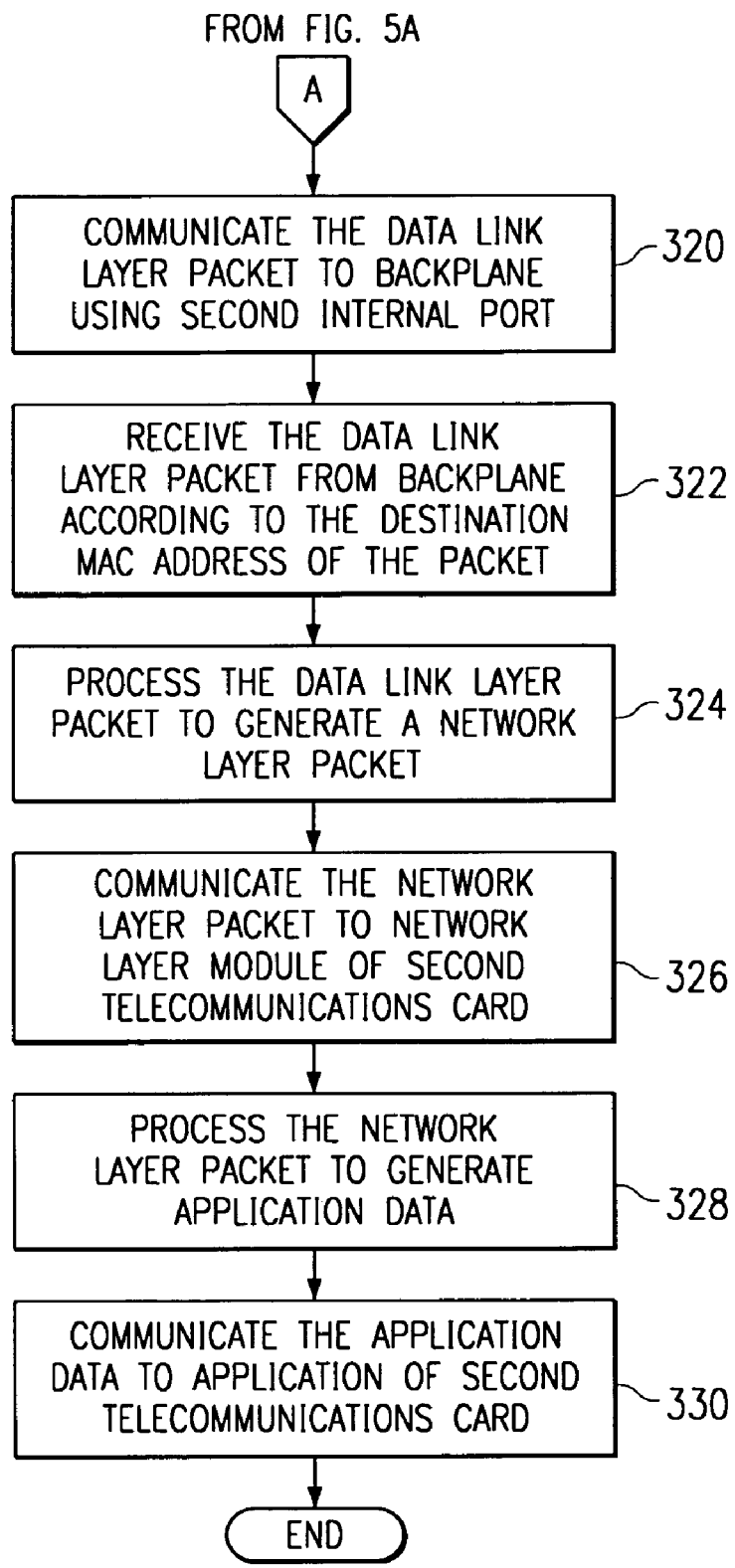

FIGS. 5A and 5B are a flowchart demonstrating a method of communicating data from first backplane card 16 to second backplane card 16 using backplane switch 12. The method begins at step 300, where application 100 of first backplane card 16 communicates application data to network layer 102 for communication to application 100 of second backplane card 16. Network layer 102 generates at least one network layer packet encapsulating the application data at step 301. If the application data includes voice, video, or other real-time information, network layer 102 assigns the network layer packet a high quality of service level by setting one or more priority bits in the network layer packet at step 303. Network layer 102 identifies an IP address associated with second backplane card 16 at step 304 and assigns the network layer packet a corresponding destination IP address at step 306. Network layer 102 communicates the network layer packet to data link layer 104 at step 308. Data link layer 104 generates at least one data link layer packet encapsulating the network layer packet at step 309. If the network layer packet is assigned a high quality of service level, data link layer 104 assigns the data link layer packet a high quality of service level by setting one or more priority bits in the data link layer packet at step 311. Data link layer 104 identifies a MAC address associated with second backplane card 16 according to the destination IP address of the network layer packet at step 312 and assigns the data link layer packet a corresponding destination MAC address at step 314. In a particular embodiment, data link layer 104 first checks look-up table 108 for a MAC address associated with the destination IP address, and if it cannot find an associated MAC address using look-up table 108, data link layer 104 broadcasts an ARP request and receives an ARP reply identifying the associated MAC address. Data link layer 104 communicates the data link layer packet to backplane 14 at step 316. Backplane switch 12 receives the data link layer packet from backplane 14 using first internal port 40 at step 318 and processes the data link layer packet according to an assigned quality of service level at step 319. In accordance with the method described above with reference to FIG. 4, backplane switch 12 communicates the data link layer packet to backplane 14 using second internal port 40 at step 320. Data link layer 104 of second backplane card 16 receives the data link layer packet from backplane 14 according to the destination MAC address of the packet at step 322. Data link layer 104 processes the data link layer packet to generate at least one network layer packet at step 324 and communicates the network layer packet to network layer module 102 of second backplane card 16 at step 326. Network layer module 102 process the network layer packet to generate application data at step 328 and communicates the application data to application 100 of second backplane card 16 at step 330, and the method ends.

Figure 6B:
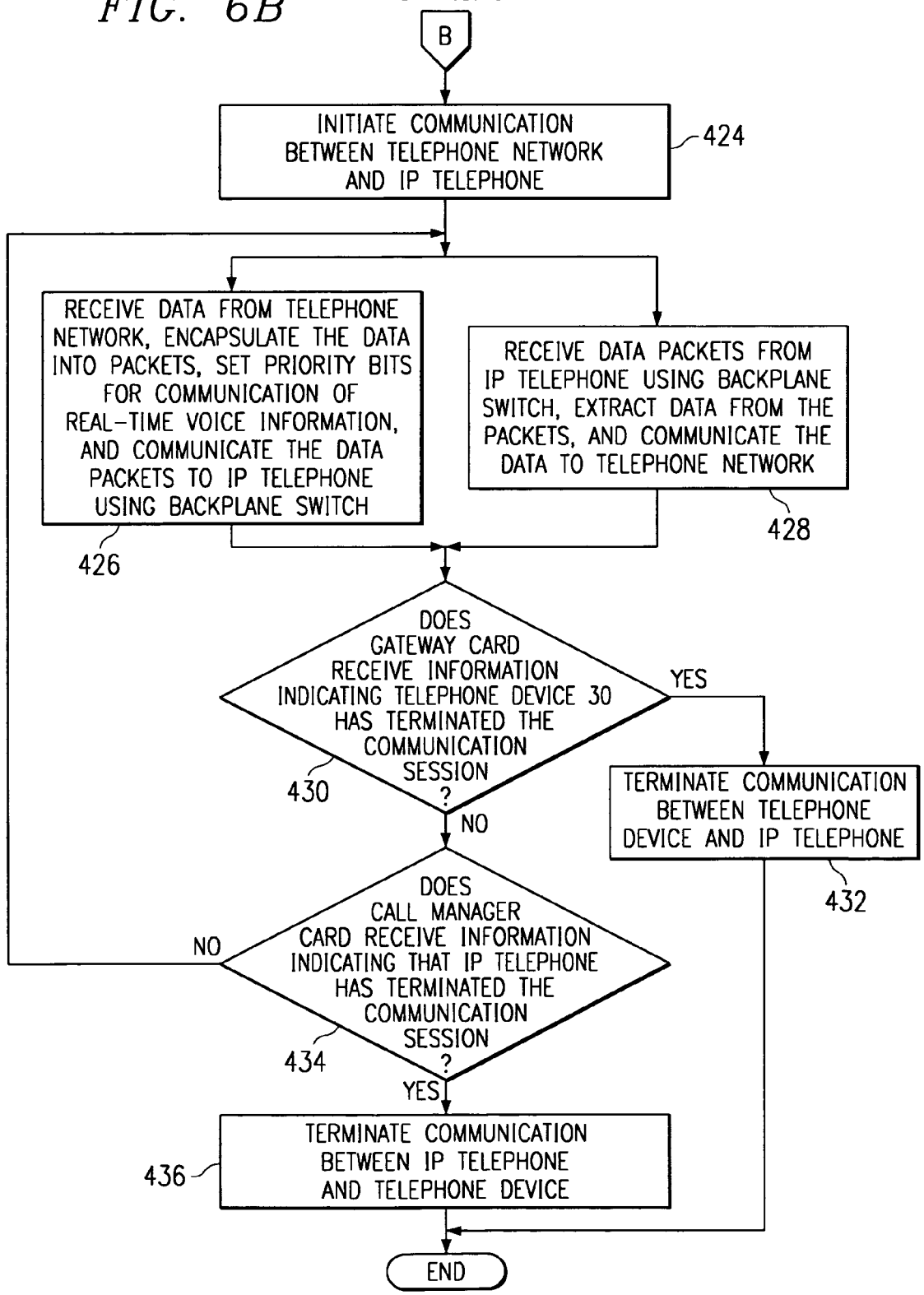

FIGS. 6A and 6B are a flowchart demonstrating the operation of a communications application that uses backplane switch 12 to communicate data packets. The method begins at step 400, where gateway card 16c receives from telephone network 27 a request to establish a telephone call with IP telephone 22a associated with a received telephone number. Gateway card 16c generates a message requesting a network address associated with the received telephone number at step 402 and communicates the request message to a call manager card 16a using backplane switch 12 at step 404. Call manager card 16a identifies the network address associated with the telephone number and generates a response message including the identified network address at step 406. Call manager card 16a communicates the response message to gateway card 16c using backplane switch 12 at step 408. Gateway card 16c informs telephone network 27 that the call is in progress at step 410. Call manager card 16a generates a message notifying IP telephone 22a, assigned to the identified network address, of the incoming calls at step 412, and call manager card 16a communicates the notification message to IP telephone 22a using backplane switch 12 at step 414. IP telephone 22a rings in response to receiving the notification message at step 415. IP telephone 22a goes off-hook or otherwise indicates a desire to establish communication at step 416 and communicates an off-hook message to call manager card 16a using backplane switch 12 at step 418. Call manager card 16a generates an initiation message to instruct gateway card 16c to begin communication between telephone network 27 and IP telephone 22a at step 420, and call manager card 16a communicates the initiation message to gateway card 16c using backplane switch 12 at step 422. Gateway card 16c initiates communication between telephone network 27 and IP telephone 22a at step 424. To perform bi-directional communication, gateway card 16c receives data from telephone network 27, encapsulates the data in packets, sets one or more priority bits in the data packets for communication of real-time voice information, and communicates the data packets to IP telephone 22a using backplane switch 12 at step 426. Gateway card 16c also receives data packets from IP telephone 22a using backplane switch 12, extracts data from the packets, and communicates the data to telephone network 27 at step 428.

If gateway card 16c receives from telephone network 27 information indicating telephone device 30 has terminated the communication session at step 430, gateway card 16c terminates communication between telephone device 30 and IP telephone 22a at step 432, and the method ends. If call manager card 16a receives from IP telephone 22a, information indicating IP telephone 22a has terminated the communication session at step 434, call manager card 16a terminates communication between IP telephone 22a and telephone 30 at step 436, and the method ends. Otherwise, the method returns to steps 426 and 428 to continue real-time voice communication.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A communications device, comprising:
    a backplane;
    a plurality of backplane cards coupled to the backplane, each backplane card assigned a Media Access Control (MAC) address; and
    a backplane switch coupled to the backplane and operable to receive a first data packet with a first MAC address assigned to a backplane card and to communicate the first data packet to the backplane card assigned the first MAC address using the backplane;
    wherein at least one backplane card is a gateway card coupled to a telephone network, the gateway card operable to receive from the telephone network a request to establish a telephone call with an external network device, to identify an Internet Protocol (IP) address associated with the network device, to process data from the telephone call into digital data packets, to associate the data packets with the identified IP address, and to communicate the data packets to the external network device using the backplane switch.

2. The communications device of claim 1, wherein the backplane switch communicates the first data packet to the backplane card according to an Ethernet protocol.

3. The communications device of claim 1, wherein the backplane switch is further operable to receive a second data packet with a second MAC address assigned to an external network device and to communicate the second data packet to the network device assigned the second MAC address.

4. The communications device of claim 3, wherein the backplane switch communicates the second data packet to the network device assigned the second MAC address by communicating the second data packet from an external port to a network switch for further communication to the network device.

5. The communications device of claim 1, wherein the backplane includes a plurality of backplane buses, at least one of the backplane buses providing a dedicated bandwidth between a backplane card and the backplane switch.

6. The communications device of claim 1, wherein the external network device is an IP telephone.

7. The communications device of claim 1, wherein:
    the gateway card is further operable to determine that the data packets include voice information and, in response, to assign a high priority level to the data packets by setting one or more priority bits in each of the data packets; and
    the backplane switch is further operable to communicate the data packets according to the assigned priority level.

8. The communications device of claim 1, wherein the backplane switch is further operable to examine one or more priority bits in the first data packet, to identify a quality of service level associated with the priority bits according to IEEE 802.1q, and to communicate the first data packet according to the identified quality of service level.

9. The communications device of claim 1, wherein at least one backplane card is a gateway card coupled to a data network, the gateway card operable to receive data packets associated with an Internet Protocol (IP) address and to communicate the data packets to an external network device assigned the associated IP address using the backplane switch.

10. The communications device of claim 1, wherein at least one of the backplane cards may be coupled to the backplane and de-coupled from the backplane while the communications device continues to operate.

11. A method of communicating data packets using a communications device including a backplane coupled to a backplane switch and a plurality of backplane cards, the method comprising:

receiving, at the backplane switch coupled to the backplane, a first data packet with a first Media Access Control (MAC) address assigned to one of the backplane cards coupled to the backplane;

communicating the first data packet from the backplane switch to the backplane card assigned the first MAC address using the backplane;

receiving from a telephone network a request to establish a telephone call with an external network device;

identifying an Internet Protocol (IP) address associated with the external network device;

processing data from the telephone call into digital data packets;

associating the data packets with the identified IP address; and communicating the data packets to the external network device using the backplane switch.

12. The method of claim 11, wherein communicating the first data packet from the backplane switch to the backplane card further comprises using an Ethernet protocol.

13. The method of claim 11, further comprising:

receiving at the backplane switch a second data packet with a second MAC address assigned to an external network device; and communicating the second data packet from the backplane switch to the network device assigned the second MAC address.

14. The method of claim 13, wherein communicating the second data packet from the backplane device to the network device assigned the second MAC address comprises:

communicating the second data packet from an external port of the backplane switch to a network switch; and communicating the second data packet from the network switch to the external network device assigned the second network address.

15. The method of claim 11, further comprising providing a dedicated bandwidth between the backplane switch and at least one of the backplane cards using a backplane bus.

16. The method of claim 11, wherein the external network device is an IP telephone.

17. The method of claim 11, further comprising:

determining whether the data packets include voice information; and assigning a high priority level to the data packets by setting one or more priority bits in each of the data packets in response to determining that the data packets include voice information.

18. The method of claim 11, further comprising:

examining one or more priority bits in the first data packet;

identifying a quality of service level associated with the priority bits according to IEEE 802.1 q; and communicating the first data packet from the backplane switch to the backplane card according to the identified quality of service level.

19. The method of claim 11, further comprising:

receiving at a backplane card a second data packet from a data network;

identifying an Internet Protocol (IP) address associated with the second data packet;

communicating the second data packet to an external network device assigned the IP address using the backplane switch.

20. The method of claim 11, wherein at least one of the backplane cards may be coupled to the backplane or de-coupled from the backplane while the communications device continues to operate.

21. A backplane card assigned a first Media Access Control (MAC) address and coupled to a backplane within a communications device, the card comprising:

an internal interface coupled to a backplane bus;

an external port coupled to a telephone network, the external port operable to receive from the telephone network a request to establish a telephone call with a network device external to the communications device; and a communication module operable to receive a first data packet from the backplane bus using the internal interface if the first data packet's destination address corresponds to the first MAC address, the communication module further operable to communicate a second data packet to another backplane card by associating the second data packet with a second MAC address assigned to the other backplane card and communicating the second data packet to the backplane bus using the internal interface, wherein the communication module is further operable to identify an Internet Protocol (IP) address associated with the external network device, to process data from the telephone call into digital data packets, and to communicate the data packets to the external network device using the backplane bus.

22. The backplane card of claim 21, wherein the communication module receives the first data packet from the backplane bus and communicates the second data packet to the backplane bus according to an Ethernet protocol.

23. The backplane card of claim 21, wherein the backplane bus provides a dedicated bandwidth between the backplane card and a backplane switch.

24. The backplane card of claim 21, wherein the communication module is further operable to communicate a third data packet to a network device external to the communications device by associating the third data packet with a third MAC address assigned to the network device and communicating the third data packet to the backplane bus using the internal interface.

25. The backplane card of claim 21, wherein the communication module is further operable to determine that the data packets include voice information and, in response, to assign a high priority level to the data by setting one or more priority bits in each of the data packets.

26. The backplane card of claim 21, wherein the communication module is further operable to set one or more priority bits in the second data packet to indicate a quality of service level according to IEEE 802.1 q.

27. The backplane card of claim 21, further comprising:
an external port coupled to a data network, the external port operable to receive a data packet associated with an Internet Protocol (IP) address; and
wherein the communication module is further operable to communicate the data packet to a network device assigned the identified IP address using the backplane bus.

28. The backplane card of claim 21, wherein the backplane card may be coupled to the backplane and de-coupled from the backplane while the communications device continues to operate.

29. A communications device, comprising:
a backplane;
a plurality of backplane cards coupled to the backplane; and
a backplane switch coupled to the backplane, the backplane switch operable to receive a first data packet with a first network address assigned to an external network device and a second data packet with a second network address assigned to one of the backplane cards, the backplane switch further operable to use a network protocol associated with the first and second network addresses to communicate the first data packet to the external network device assigned the first network address and to communicate the second data packet to the backplane card assigned the second network address, wherein the backplane switch communicates the second data packet to the backplane card using the backplane, wherein at least one backplane card is a gateway card coupled to a data network, the gateway card operable to receive data packets associated with an Internet Protocol (IP) address and to communicate the data packets to an external network device assigned the associated IP address using the backplane switch.

30. The communications device of claim 29, wherein the network addresses are standard-based network addresses.

31. The communications device of claim 29, wherein:
the network addresses are Media Access Control (MAC) addresses; and
the network protocol is an Ethernet protocol.

32. The communications device of claim 29, wherein the backplane includes a plurality of backplane buses, at least one of the backplane buses providing a dedicated bandwidth between the backplane switch and one of the backplane cards.

33. The communications device of claim 29, wherein at least one backplane card is a gateway card coupled to a telephone network, the gateway card operable to receive from the telephone network a request to establish a telephone call with the external network device, to identify an Internet Protocol (IP) address associated with the external network device, to process data from the telephone call into digital data packets, to associate the data packets with the identified IP address, and to communicate the data packets to the external network device using the backplane switch.

34. The communications device of claim 33, wherein the external network device is an IP telephone.

35. The communications device of claim 33, wherein:
the gateway card is further operable to determine that the data packets include voice information and, in response, to assign a high priority level to the data packets by setting one or more priority bits in each of the data packets; and
the backplane switch is further operable to communicate the data packets including voice information according to the assigned priority level.

36. The communications device of claim 29, wherein the backplane switch is further operable to examine one or more priority bits in the first data packet, to identify a quality of service level associated with the priority bits according to IEEE 802.1q, and to communicate the first data packet according to the identified quality of service level.

37. The communications device of claim 29, wherein at least one of the backplane cards may be coupled to the backplane and de-coupled from the backplane while the communications device continues to operate.

38. A method of communicating data using a communications device, the communications device including a backplane coupled to a backplane switch and a plurality of backplane cards, the backplane switch coupled to at least one network device external to the communications device, the method comprising:
receiving, at the backplane switch, a first data packet with a first network address assigned to the external network device and a second data packet with a second network address assigned to one of the backplane boards;
using a network protocol associated with the first and second network addresses to communicate the first data packet from the backplane switch to the external network device assigned the first network address and to communicate the second data packet from the backplane switch to the backplane card assigned the second network address using the backplane;
receiving from a telephone network a request to establish a telephone call with the external network device;
identifying an Internet Protocol (IP) address associated with the external network device;
processing data from the telephone call into digital data packets;
associating the data packets with the identified IP address;
communicating the data packets from a backplane card to the backplane switch; and
communicating the data packets to the external network device using the backplane switch.

39. The method of claim 38, wherein the network protocol is a standard-based network protocol.

40. The method of claim 38, wherein the first and second network addresses are Media Access Control (MAC) addresses.

41. The method of claim 38, further comprising providing a dedicated bandwidth between the backplane switch and at least one of the backplane cards using a backplane bus.

42. The method of claim 38, wherein the external network device is an IP telephone.

43. The method of claim 38, further comprising:
determining whether the data packets include voice information; and
assigning a high priority level to the data packets by setting one or more priority bits in each data packet in response to determining that the data packets include voice information.

44. The method of claim 38, further comprising:
examining one or more priority bits associated with the first data packet;
identifying a quality of service level associated with the priority bits according to IEEE 802.1q; and communicating the first data packet from the backplane switch according to the identified quality of service level.

45. The method of claim 38, further comprising:
receiving a third data packet from a data network;
identifying an Internet Protocol (IP) address associated with the third data packet;
communicating the third data packet from a backplane card to the backplane switch; and
communicating the third data packet from the backplane switch to an external network device assigned the identified IP address.

46. The method of claim 38, wherein at least one of the backplane cards may be coupled to the backplane or de-coupled from the backplane while the communications device continues to operate.

47. A backplane switch coupled to a backplane of a communications device, the communications device having a plurality of backplane cards coupled to the backplane, the backplane switch comprising:
a plurality of internal ports, each internal port associated with a backplane card and operable to communicate with the associated backplane card using the backplane;
at least one external port associated with a network device external to the communications device and operable to communicate with the external network device; and
a processing module coupled to the internal ports and the external port, the processing module operable to receive a first data packet with a first network address assigned to the network device, to identify the external port associated with the network device, and to communicate the first data packet to the external port for communication to the network device using a network protocol, the processing module further operable to receive a second data packet with a second network address assigned to a backplane card, to identify one of the internal ports associated with the backplane card, and to communicate the second data packet to the identified internal port for communication to the backplane card using the network protocol;
wherein the backplane card is a gateway card coupled to a data network, the gateway card operable to receive data packets associated with an Internet Protocol (IP) address and to communicate the data packets to an external network device assigned the associated IP address using the backplane switch.

48. The backplane switch of claim 47, wherein the first and second network addresses are standard-based network addresses.

49. The backplane switch of claim 47, wherein:
the first and second network addresses are Media Access Control (MAC) addresses; and
the network protocol is an Ethernet protocol.

50. The backplane switch of claim 47, wherein the backplane includes a plurality of backplane buses, at least one of the backplane buses providing a dedicated bandwidth between an internal port and an associated backplane card.

51. The backplane switch of claim 47, wherein the external port is coupled to a network switch serving a plurality of external network devices and is further operable to communicate the first data packet with the first network address to the network switch for communication to the network device assigned the first network address.

52. The backplane switch of claim 47, wherein the backplane switch is further operable to examine one or more priority bits in the first data packet, to identify a quality of service level associated with the priority bits according to IEEE 802.1q, and to communicate the first data packet according to the identified quality of service level.

53. The backplane switch of claim 47, wherein at least one of the backplane cards may be coupled to the backplane and de-coupled from the backplane while the communications device continues to operate.

* * * * *